(12) United States Patent
Kato et al.

(10) Patent No.: US 8,849,049 B2
(45) Date of Patent: Sep. 30, 2014

(54) IMAGE CODING DEVICE AND IMAGE DECODING DEVICE

(75) Inventors: Haruhisa Kato, Saitama (JP); Sei Naito, Saitama (JP)

(73) Assignee: KDDI Corporation, Tokyo (JP)

( * ) Notice: Subject to any disclaimer, the term of this patent is extended or adjusted under 35 U.S.C. 154(b) by 503 days.

(21) Appl. No.: 13/327,239

(22) Filed: Dec. 15, 2011

(65) Prior Publication Data
US 2012/0177299 A1 Jul. 12, 2012

(30) Foreign Application Priority Data
Jan. 6, 2011 (JP) .................................. 2011-001136

(51) Int. Cl.
G06K 9/36 (2006.01)
H04N 19/105 (2014.01)
H04N 19/593 (2014.01)

(52) U.S. Cl.
CPC ... H04N 19/00763 (2013.01); H04N 19/00024 (2013.01)
USPC ........................................................ 382/238

(58) Field of Classification Search
USPC ................ 382/232–251; 375/240.01–240.29; 348/411.1–412.1
See application file for complete search history.

(56) References Cited

U.S. PATENT DOCUMENTS

| | | | | |
|---|---|---|---|---|
| 4,992,889 A * | 2/1991 | Yamagami et al. | ............ | 382/238 |
| 5,394,190 A * | 2/1995 | Yamada | ....................... | 348/411.1 |
| 5,576,767 A * | 11/1996 | Lee et al. | .................. | 375/240.14 |
| 5,923,783 A * | 7/1999 | Kawauchi et al. | ............ | 382/233 |
| 8,204,320 B2 * | 6/2012 | Lee et al. | ....................... | 382/232 |
| 8,311,348 B2 * | 11/2012 | Lee et al. | ....................... | 382/232 |
| 8,358,860 B2 * | 1/2013 | Kotaka et al. | .................. | 382/236 |
| 8,515,190 B2 * | 8/2013 | Lee et al. | ....................... | 382/232 |
| 8,644,382 B2 * | 2/2014 | Tsukuba et al. | .......... | 375/240.12 |
| 2008/0225952 A1 * | 9/2008 | Wang et al. | .............. | 375/240.16 |
| 2010/0260260 A1 * | 10/2010 | Wiegand et al. | ......... | 375/240.12 |
| 2011/0058608 A1 * | 3/2011 | Yang et al. | ................ | 375/240.12 |
| 2013/0022124 A1 * | 1/2013 | Sekiguchi et al. | ........ | 375/240.16 |

FOREIGN PATENT DOCUMENTS

| | | |
|---|---|---|
| JP | 2007-43651 | 2/2007 |
| JP | 2007-74725 | 3/2007 |
| JP | 2009-49969 | 3/2009 |

OTHER PUBLICATIONS

Kadono et al., "H.264/AVC Text Impress Standard Text Series," Impress Network Business Company, p. 108, figure 5-3; pp. 203-205; 2004.

* cited by examiner

*Primary Examiner* — Ishrat I Sherali
(74) *Attorney, Agent, or Firm* — Westman, Champlin & Koehler, P.A.

(57) ABSTRACT

To provide an image coding device having high coding efficiency and an image decoding device. A plurality of prediction procedures that uses various types of correlations between pixels are adaptively applied with a coded signal as a reference. With respect to an input pixel, first residual and prediction information are obtained by a first prediction unit that carries out in-screen prediction and the like, second residual and prediction information are obtained by a second prediction unit for predicting a first residual as a serial additional process, and third residual and prediction information are obtained by a third prediction unit for directly predicting a pixel to be coded as a parallel additional process on the input pixel. Which of either the second residual or the third residual to code is determined based on the coding cost, and the signal is switched in the first switching unit.

12 Claims, 4 Drawing Sheets

IMAGE CODING DEVICE AND IMAGE DECODING DEVICE

The present application claims priority of Japanese patent application Serial No. 2011-001136, filed Jan. 6, 2011, the content of which is hereby incorporated by reference in its entirety.

TECHNICAL FIELD

The present invention relates to an image coding device for predicting a coding target by adaptively applying a plurality of different prediction procedures on correlative information and coding a prediction residual, and an image decoding device.

BACKGROUND ART

A method of enhancing the coding efficiency in the conventional image coding includes a method of reducing spatial redundancy. The prediction of a target block is carried out using an adjacent coded pixel in an intra prediction coding in H.264. H.264 is disclosed in Kadono et al., "H.264/AVC text Impress standard text series", Impress network business company, 2004, and the like.

Japanese Patent Application Laid-Open No. 2007-043651 proposes searching for a similar area from a coded region with an adjacent coded pixel as a template, and using an adjacent region at the same positional relationship as the target block as a prediction value of the target block.

Japanese Patent Application Laid-Open No. 2007-074725 proposes dividing the target block into plurals, coding and decoding one part of the divided block, and using the pixel in which one part of the block is decoded for the prediction on the remaining pixels.

Furthermore, Japanese Patent Application Laid-Open No. 2009-049969 proposes using not only the adjacent pixels between blocks but also the adjacent pixel in the target block as a prediction value to use high correlation between adjacent pixels.

CITATION LIST

Patent Literature

Patent Literature 1 "Japanese Patent Application Laid-Open No. 2007-043651"
Patent Literature 2 "Japanese Patent Application Laid-Open No. 2007-074725"
Patent Literature 3 "Japanese Patent Application Laid-Open No. 2009-049969"

Non Patent Literature

Non Patent Literature 1 Kadono et al., "H.264/AVC text Impress standard text series", Impress network business company, (P. 108 FIG. 5-3, pp. 203-205) 2004

SUMMARY OF INVENTION

Technical Problem

The Intra prediction of H.264 generates the prediction value of the target block with the coded neighboring pixel as a reference, and hence the prediction error becomes larger the more distant from the pixel serving as the reference of prediction.

In the technique disclosed in Japanese Patent Application Laid-Open No. 2007-043651, information representing the location for instructing the block to use in the prediction of the target block does not need to be stored, but the prediction accuracy may not be sufficient since the blocks may not be similar even if the adjacent pixels to become a template are similar.

In the technique disclosed in Japanese Patent Application Laid-Open No. 2007-074725, one part of the block to be coded first has the same problem as H.264 when predicting the divided target block.

In the technique disclosed in Japanese Patent Application Laid-Open No. 2009-049969, if the adjacent pixel is not coded, a quantization error may be propagated since the differential value with the adjacent pixel in the original image is coded.

In view of solving the problems of the related art, it is an object of the present invention to provide an image coding device having high coding efficiency.

Solution to Problem

In order to accomplish the object, the feature of this invention is that an image coding device for coding an input image for every unit block in coding using prediction, the image coding device comprising: a first prediction unit for determining first prediction information for predicting a block to be coded using a reconstructed pixel signal reconstructed using a coded signal; a first compensation unit for obtaining a first prediction signal of said block to be coded from said first prediction information and said reconstructed pixel signal; a first differential unit for obtaining a difference between a signal of said block to be coded and said first prediction signal as a first residual signal; a second prediction unit for determining second prediction information as a prediction coefficient for predicting said first residual signal using a reconstructed residual signal reconstructed using the coded signal; a second compensation unit for obtaining a second prediction signal of said first residual signal from said second prediction information and said reconstructed residual signal; a second differential unit for obtaining a difference between said first residual signal and said second prediction signal as a second residual signal; a third prediction unit for determining third prediction information as a prediction coefficient for predicting said block to be coded using said reconstructed pixel signal; a third compensation unit for obtaining a third prediction signal of said block to be coded from said third prediction information and said reconstructed pixel signal; a third differential unit for obtaining a difference between a signal of said block to be coded and said third prediction signal as a third residual signal; and a switching unit for switching and selecting one of either said second residual signal or said third residual signal for every unit block, wherein orthogonal transformation, quantization, and coding are performed on the selected residual, and said reconstructed residual signal and said reconstructed pixel signal are obtained using prediction information corresponding to the selected residual to code the prediction information.

Advantageous Effects of Invention

According to the image coding device of the present invention, high coding efficiency is obtained by adaptively applying a plurality of prediction procedures that use various types of correlations between pixels with a coded signal as a reference.

BRIEF DESCRIPTION OF DRAWINGS

FIG. 5 is a view describing an example of a relationship of a representative value used when applying a third prediction unit and the like, a predicted signal, and a coded neighboring region and the like.

DESCRIPTION OF EMBODIMENTS

Figure 1:
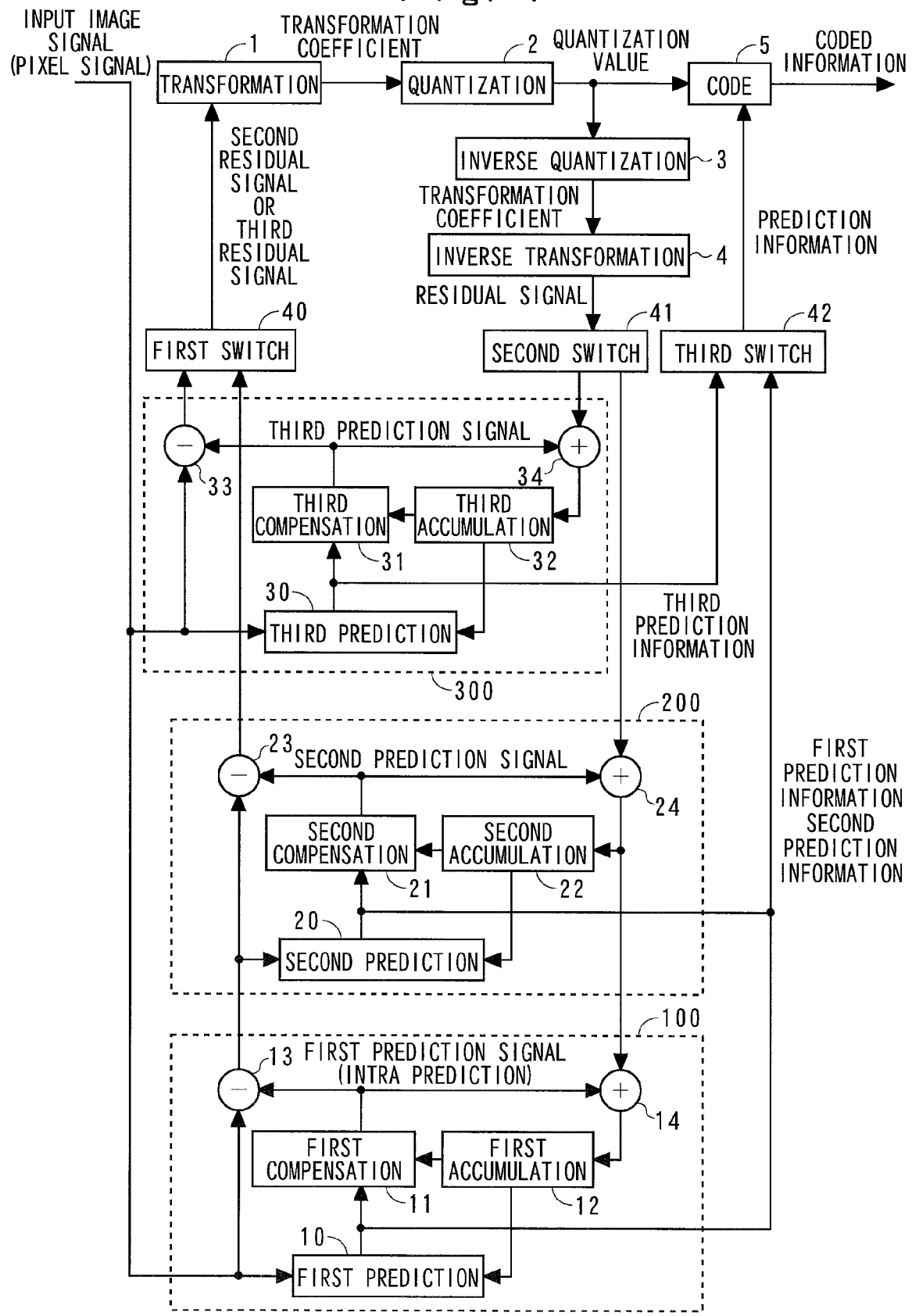
FIG. 1 is a function block diagram of an image coding device of the present invention.

Hereinafter, the present invention will be described in detail with reference to the drawings. FIG. 1 shows a function block diagram of an image coding device according to the present invention. The image coding device of the present invention has a configuration in which the function of predicting the residual signal in the unit block from the coded residual signal in parallel and in series is added with respect to an image coding device for performing orthogonal transformation, quantization, and coding on a residual signal obtained by performing a differential process with each pixel predicted from a coded pixel with respect to each pixel of a unit block configured by a plurality of pixels to perform coding for every unit block, so that it can be appropriately selected.

When viewed from the input image signal (non-coded pixel signal) side, the parallel addition is the relationship of function block groups 100 (first prediction unit 10, compensation unit 11, accumulation unit 12, differential unit 13, and addition unit 14) and 300 (third prediction unit 30, compensation unit 31, accumulation unit 32, differential unit 33, and addition unit 34) shown in FIG. 1; and the serial addition is the relationship of the function block groups 100 and 200 (second prediction unit 20, compensation unit 21, accumulation unit 22, differential unit 23, and addition unit 24). The present invention has characteristics in the coordination of such function block groups.

In other words, as shown in FIG. 1, as a configuration responsible for the main portion of its function, the image coding device of the present invention is configured to include, with respect to an image coding device including a transformation unit 1 for transforming a residual signal to a frequency region in orthogonal transformation and obtaining an orthogonal transformation coefficient, a quantization unit 2 for quantizing the orthogonal transformation coefficient to obtain a quantization value, a coding unit 5 for variable length coding the quantization value and the applied prediction information and obtaining coded information, an inverse quantization unit 3 for inverse quantizing the quantization value and obtaining an orthogonal transformation coefficient, an inverse transformation unit 4 for inverse transforming the inverse quantized orthogonal transformation coefficient and obtaining the residual signal, a first prediction unit 10 for determining the prediction information for reducing redundancy from the pixel signal, and a first compensation unit 11 for re-constructing the prediction signal from the prediction information, second and third prediction units 20, 30 for predicting the signal from the pixel signal or the residual signal, second and third compensation units 21, 31 for obtaining the prediction signal, and first, second, and third switching units 40, 41, 42 for appropriately switching both signals and corresponding/accompanying information.

Figure 2:
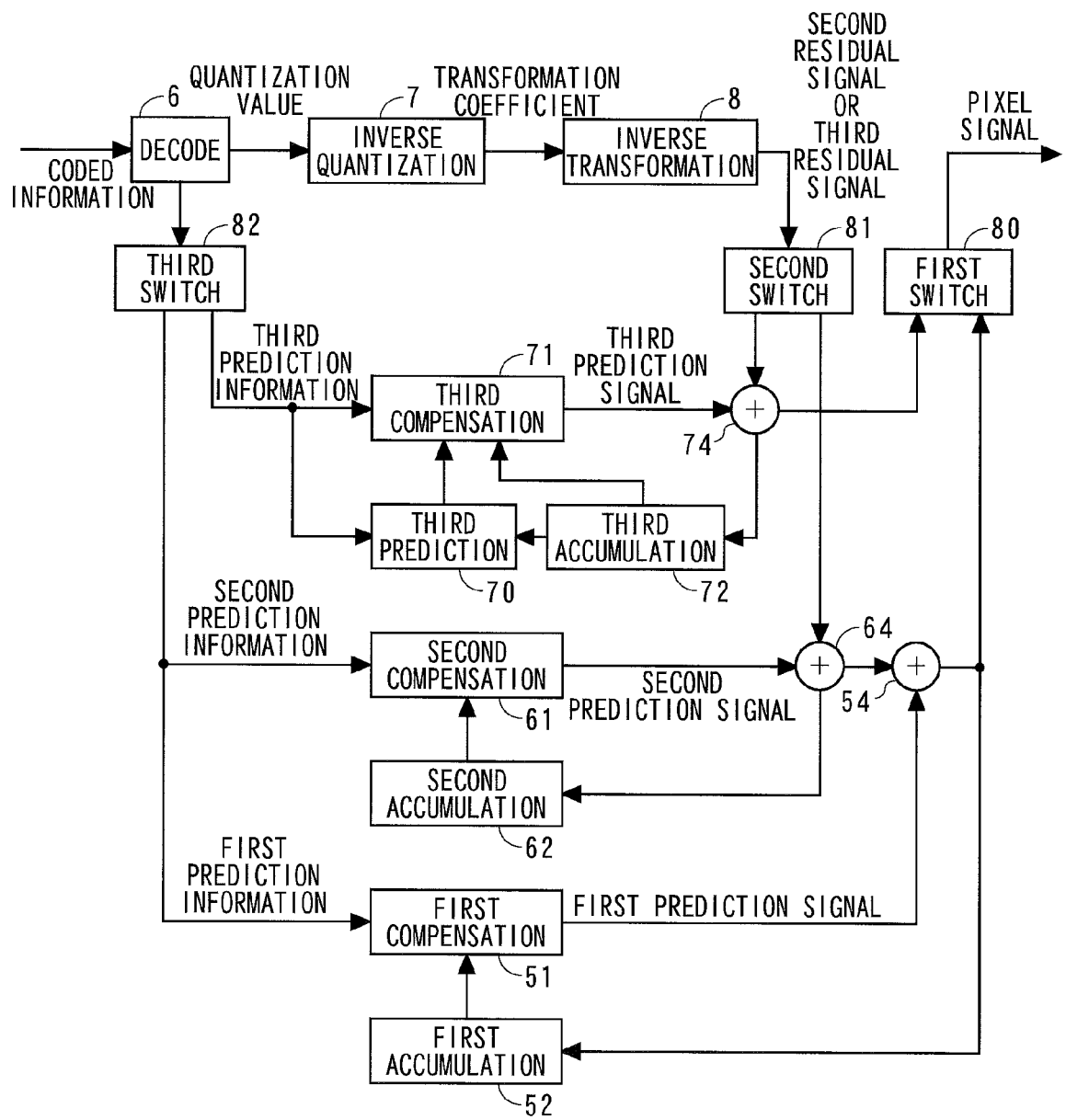
FIG. 2 is a function block diagram of an image decoding device corresponding to the image coding device of FIG. 1.

As shown in FIG. 2, as a configuration responsible for the main portion of its function, the image decoding device of the present invention is configured to include, with respect to an image decoding device including a decoding unit 6 for variable length decoding the coded information and obtaining the quantization value, an inverse quantization unit 7 for inverse quantizing the quantization value and obtaining the orthogonal transformation coefficient, an inverse transformation unit 8 for inverse transforming the inverse quantized orthogonal transformation coefficient and obtaining the residual signal, and a first compensation unit 51 for re-constructing the prediction signal from the stored first prediction information and the decoded pixel signal, a third prediction unit 70 for predicting the signal from the pixel signal and second and third compensation units 61, 71 for obtaining the prediction signal, and first, second, and third switching units 80, 81, 82 for appropriately switching both signals and corresponding/accompanying information.

Each function block of the image coding device of the present invention shown in FIG. 1 will be described below.

The first differential unit 13 calculates the difference between an input image signal (pixel signal) and a first prediction signal predicted from the coded pixel sent from the first compensation unit 11. The first residual signal obtained by taking the difference is sent to the second prediction unit 20 and the second differential unit 23.

The second differential unit 23 calculates the difference between the first residual signal sent from the first differential unit 13 and the prediction signal predicted from the coded residual signal sent from the second compensation unit 21. The second residual signal obtained by taking the difference is sent to the transformation unit 1 if selected by the first switching unit 40 as will be described later.

The third differential unit 33 calculates the difference between the input image signal (pixel signal) and the third prediction signal predicted from the coded pixel sent from the third compensation unit 31. The third residual signal obtained by taking the difference is sent to the transformation unit 1 if selected by the first switching unit 40 as will be described later.

The first addition unit 14 re-constructs the coded pixel by calculating the sum of the residual signal sent from the second addition unit 24 and the prediction signal sent from the first compensation unit 11. The coded pixel signal (reconstructed pixel signal) obtained by adding is saved in the first accumulation unit 12 to be referenced and used by the first prediction unit 10 and the first compensation unit 11.

The second addition unit 24 calculates the sum of the reconstructed residual signal sent from the inverse transformation unit 4 through the second switching unit 41 and the prediction signal sent from the second compensation unit 21 to reconstruct a first residual signal. The first residual signal obtained by adding is sent to the second accumulation unit 22 and the first addition unit 14. In the second accumulation unit 22, the first residual signal is saved so as to be referenced and used by the second prediction unit 20 and the second compensation unit 21.

The third addition unit 34 calculates the sum of the reconstructed residual signal sent from the inverse transformation unit 4 through the second switching unit 41 and the third prediction signal sent from the third compensation unit 31 to reconstruct a coded pixel. The coded pixel signal (reconstructed pixel signal) obtained by adding is sent to and saved in the third accumulation unit 32. The saved coded pixel signal is referenced and used by the third prediction unit 30 and the third compensation unit 31.

Either one of the second or third residual signal sent from the second differential unit 23 or the third differential unit 33 is selected by the first switching unit 40 and input to the transformation unit 1. The selected residual signal is transformed to the frequency region by orthogonal transformation, and the transformation coefficient obtained by orthogonal transformation is output to the quantization unit 2. The orthogonal transformation may be DCT or approximate transformation of DCT, DWT, or the like.

In the image coding device of the present invention, each picture (frame) of the input image is divided into unit blocks configured by pixels of predefined number (e.g., 32×32 pixels, 16×16 pixels, 8×8 pixels, 4×4 pixels, or combination thereof), so that coding is carried out for every unit block.

The quantization unit 2 quantizes the transformation coefficient sent from the transformation unit 1. The quantization value obtained by quantization is output to the coding unit 5 and the inverse quantization unit 3. The quantization parameter used in the quantization process can be set as a combination of constant values. The bit rate to output may be maintained constant by performing the control according to the amount of information of the transformation coefficient.

Alternatively, as one embodiment of the quantization parameter in the quantization unit 2, the overall performance can be enhanced by performing a control such that the quantization error becomes small with respect to the signal (channel) to become the reference of prediction. The signal to become the reference of prediction will be described later.

The coding unit 5 codes the quantized transformation coefficient sent from the quantization unit 2, and the first to third prediction information sent from the first to third prediction units, and outputs as the coded information. The coding may use variable length code or arithmetic code that removes redundancies between codes.

The inverse quantization unit 3 performs the procedure opposite of the quantization process in the quantization unit 2 to inversely quantize the quantized transformation coefficient sent from the quantization unit 2. The transformation coefficient including the quantization error obtained through the inverse quantization is sent to the inverse transformation unit 4.

The inverse transformation unit 4 performs the procedure opposite of the orthogonal transformation in the transformation unit 1 to inversely orthogonal transform the transformation coefficient including the quantization error sent from the inverse quantization unit. The residual signal including the quantization error obtained by inverse transformation is sent to either the second addition unit 24 or the third addition unit 34 through the second switching unit 4.

The second switching unit 41 carries out the selection process of sending the residual signal sent from the inverse transformation unit 4 to the second addition unit 24 if originating from the second residual signal subjected through the processes of the function block groups 100 and 200, and sending the residual signal to the third addition unit 34 if originating from the third residual signal subjected to the process of the function block group 300.

Such selection process is carried out in cooperation with the first switching unit 40 and the third switching unit 42, and is carried out by the control unit or the like for controlling the entire function block of the coding device not shown in FIG. 1. As will be described below, according to such cooperation, the first and second prediction information are passed by the third switching unit 42 if the second residual signal is passed by the first and second switching units 40, 41, so that the second residual signal and the first and second prediction information are coded as a set. The third prediction information is passed by the third switching unit 42 if the third residual signal is passed by the first and second switching units 40, 41, so that the third residual signal and the third prediction information are coded as a set. Therefore, the first, second, and third switching units 40, 41, 42 carry out switching in cooperation so that the corresponding signal and information are coded together. This is similar in the first, second, and third switching units 80, 81, and 82 on the decoder side.

The first prediction unit 10 determines the prediction information for reducing the redundancy of the input pixel, and determines the first prediction information for predicting and approximating the input signal based on the coded pixel (reconstructed pixel) including the quantization error saved in the first accumulation unit 12. The determined first prediction information is sent to the first compensation unit 11, and also sent to the coding unit 5 through the third switching unit 42. Various methods conventionally used can be applied for the first prediction.

By way of example, when using the intra prediction of the international standard H.264, the intra prediction mode of individually coding in each intra prediction mode, and minimizing the coding cost calculated as a weighted sum or the like from the code amount and the distortion amount is selected as the first prediction information. The details on the method of minimizing the coding cost are described in Kadono et al., "H.264/AVC text Impress standard text series", Impress network business company, 2004.

The first compensation unit 11 predicts redundancy and reconstructs the first prediction signal, where the prediction signal of the relevant region is generated from the first prediction information sent from the first prediction unit 10 and the coded pixel signal saved in the first accumulation unit 12. The first prediction signal is sent to the first differential unit 13 and the first addition unit 14 in the encoder, and only to the first addition unit 54 in the decoder.

The calculation of the residual signal (second and third residual signals) input to the transformation unit 1 through the function block groups 200 and 300, which are characteristic configurations of the image coding device of the present invention, will be described with the associated function blocks in FIG. 1.

In calculating the residual signal, the calculation of the second prediction signal and the third prediction signal becomes necessary. The calculation of the second prediction signal is carried out by the configuration of arranging the second prediction unit 20 and the second compensation unit 21 in the function block group 200 in correspondence with the first prediction unit 10 and the first compensation unit 11 in the function block group 100. The calculation of the third prediction signal is carried out by the configuration of arranging the third prediction unit 30 and the third compensation unit 31 in the function block group 300.

The second residual signal and the third residual signal are compared with regards to the coding cost corresponding thereto, and the one with smaller coding cost is exclusively selected by the first switching unit 40. The coding cost corresponding to the second residual signal is the coding cost of the second residual signal, the first prediction information, and the second prediction information, and the coding cost corresponding to the third residual signal is the coding cost of the third residual signal and the third prediction information.

In the present invention, an embodiment of evaluating also a case in which the residual signal is forcibly eliminated in the calculation of the coding cost (case in which value of residual signal is zero) using the fact that the prediction residual tends to become smaller since the prediction accuracy is higher due to the improvement of the prediction unit is desirable. In other words, in the embodiment, transformation, quantization, and coding are performed by comparing a total of four types of values, the coding cost (two types) corresponding to the second and third residual signals and the coding cost (two types) corresponding to the residual signals of when the second and third residual signals are zero, and adopting that of minimum cost. The relevant process can be carried out as an additional process in the first switching unit 40, and the like.

In the embodiment, the coding in zero residual that is advantageous for the total coding cost can be adopted when the code amount can be greatly reduced even if the amount of distortion is slightly increased with the residual as zero than when the already sufficiently small prediction residual is coded and the image quality is slightly enhanced while slightly suppressing the amount of distortion.

Each function of the second prediction unit 20, the second compensation unit 21, the third prediction unit 30, and the third compensation unit 31 will be hereinafter described.

The second prediction unit 20 determines the second prediction information for reducing the redundancy remaining in the first residual signal in the unit block. The second prediction unit 20 calculates the prediction coefficient for approximating and predicting the first residual signal sent from the first differential unit 13 with the method, to be described later, from the first residual signal including the quantization error saved in the second accumulation unit 22. The calculated prediction coefficient is sent to the second compensation unit 21 and to the coding unit 5 through the third switching unit 42 as the second prediction information.

However, the second prediction unit 20 and the second compensation unit 21 are omitted if the input first residual signal is flat. Whether flat or not is determined from whether or not the variance (dispersion value etc.) of each value of the unit block of the first residual signal satisfies a predetermined standard such as smaller, or smaller than or equal to a predetermined value. If determined as flat, the signal having the value of the first residual signal is used for the second residual signal to be sent to the first switching unit 40 according to the above omission. The processes of determination and omission are carried out by the control unit (not shown). In this case, the flag information indicating that the omission is carried out is used for the second prediction information, so that control can be performed to omit the processes of second prediction and compensation on the decoding side.

The calculation of the prediction coefficient by the second prediction unit 20, and the generation order of the second prediction signal by the second compensation unit 21 for cases other than the above, that is, when the input first residual signal is not flat will be described below.

Figure 3:
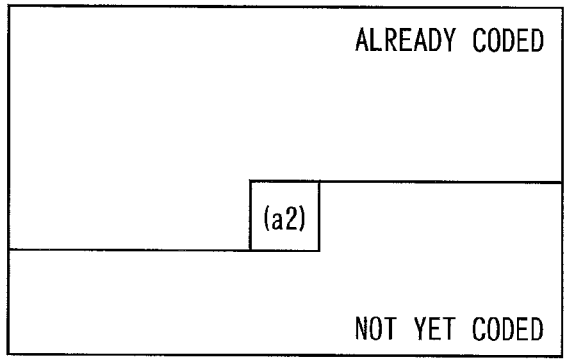
FIG. 3 is a view describing an example of a relationship between a prediction reference signal used when applying a second prediction unit, and the like and a predicted signal.

First, it is to be noted that the first residual signal saved in the second accumulation unit 22 used to generate the second prediction signal is the first residual signal in the signal of a block at the same position in the frame of the same time as the block to be coded and the already coded different channel, as conceptually shown in FIG. 3. Each signal channel may use each color space axis in the signal mapped to an arbitrary color space such as RGB signal, YUV signal, or YCbCr signal. FIG. 3 shows an example of the RGB signal, where the already coded block (a2) in the G signal frame shown in (a1) is such that the first residual signal of the G signal in the block is reconstructed and saved in the second accumulation unit 22 to be used as a reference. The block to be coded (b2) is the block at the same position in the frame (b1) of the R signal in the same time frame as the relevant (a2). When coding the R signal block (b2), as for the reconstructed first residual signal to be referenced in the second accumulation unit 22, the first residual signal in the coded G signal block (a2) is adopted.

The signal (channel) to become the reference of prediction that controls the quantization parameter such that the quantization error becomes small in the quantization unit 2 is a signal (channel) coded before the channel to be coded of the block to be coded such as the G signal shown in the example of FIG. 3. In the present invention, the predicted signal of a different channel is coded using the residual signal in the prediction reference signal, and hence the predicted signal can also be predicted at high accuracy by having the prediction reference signal at high image quality such that the quantization error becomes small, which leads to reduction in the total coding cost. The signal such as the G signal in the example of FIG. 3 is generally referred to as the prediction reference signal, and the signal such as the R signal is referred to as the predicted signal.

In the second prediction unit 20, when the second prediction unit performs correction with affine prediction as an example of correction by the prediction coefficient, a representative value $g_i$ with respect to each pixel position is calculated for every small region inside the block, as hereinafter described, from the coded first residual signal with the affine coefficient $a_j$ ($1 \leq j \leq 2$) as the second prediction coefficient, and the residual signal $r_i$ of the relevant block is predicted with (Math. 1).

$$r_i = a_1 g_i + a_2 \quad 1 \leq i \leq n \quad \text{[Math. 1]}$$

Here, n represents the number of pixels in the block.

The representative value $g_i$ may use the value of the first residual signal at the relevant pixel position as is, but preferably uses a representative value serving as a value calculated from the value of the first residual signal in each small region from the standpoint of noise resistance, as will be described later.

Figure 4:
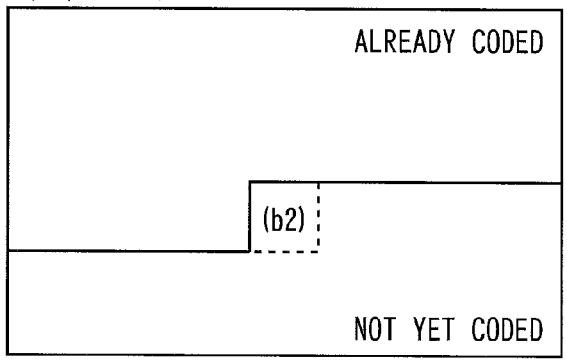
FIG. 4 is a view describing an example of a relationship of a representative value used when applying the second prediction unit and the like and a predicted signal, and a small region for calculating the representative value.

An example of the representative value $g_i$ and the residual signal $r_i$ to be predicated is shown in FIG. 4. In FIG. 4, (a2) and (b2) are the same as FIG. 3, and show the block of the coded G signal and the block of the R signal to be coded, respectively. In FIG. 4, an example in which the coded first residual signal in (a2) is a residual signal by the prediction mode 0 for predicting in the vertical direction of the prediction modes 0 to 8 of the 4×4 intra prediction of the H.264 in the function block group 100. In other words, A1 ($g_1$ to $g_4$), A2 ($g_5$ to $g_8$), A3 ($g_9$ to $g_{12}$) and A4 ($g_{13}$ to $g_{16}$) show the representative value $g_i$ of the first residual signal at the four pixel positions in the vertical direction predicted from the same adjacent pixel of the upper end of (a2). In this example, A1 to A4 are set as small regions. The residual signals B1 ($r_1$ to $r_4$), B2 ($r_5$ to $r_8$), B3 ($r_9$ to $r_{12}$) and B4 ($r_{13}$ to $r_{16}$) at the same position are predicted using the representative value defined on each pixel position.

The calculation of the representative value desirably provides resistance to noise by using Gaussian filter or the like when the correlation of the input signal is independent (e.g., independent among R, G, B signals for RGB signal) such as a three plate type camera. Also, a filter adapted to the noise characteristics corresponding to the first prediction information may be applied. In other words, in the example of FIG. 4, since prediction is made in the vertical direction, if the noise is superimposed on the first residual signal of the pixel at the position of $g_6$, it is not preferable if the influence of the noise is stretched in the horizontal direction (e.g., position of $g_2$, or position of gio) by the filter processing with respect to the first residual signal calculated by the prediction mode 0 in the vertical direction. Thus, in the example of (a2), the filter processing is to be individually carried out for every pixel in each small region A1 to A4 of each vertical direction. In the small region A1, the filter processing is performed on the residual signals at the positions of $g_1$ to $g_4$.

The filter application adapted to the noise characteristics corresponding to the first prediction information is described in the example of the prediction mode 0 of the 4×4 intra prediction of H.264, but it is apparent that the filter processing can be similarly applied for every region corresponding to the direction of the prediction information even in other examples. For instance, in another prediction mode of the 4×4 intra prediction of H.264, the filter is applied on each region in the horizontal direction in the case of the prediction mode 1 and the entire 4×4 unit block of regional distinction, which is assumed as one region, in the case of prediction mode 2. The filter is applied on each region corresponding to the diagonal prediction direction for the prediction modes 3 to 8.

The prediction coefficient $a_j$ is estimated such that the weighted square sum of the prediction error becomes a minimum. Specifically, one example of a calculation method for the prediction coefficient $a_j$ will be described. The weighted square sum E of the prediction error is expressed with (Math. 2).

$$E = \sum_i w_i (a_1 g_i + a_2 - r_i)^2 \quad \text{[Math. 2]}$$

In this case, the partial differentiation of the square error E by the coefficient $a_j$ is expressed with (Math. 3).

$$\frac{1}{2}\frac{\partial E}{\partial a_1} = \sum_i w_i g_i (a_1 g_i + a_2 - r_i) \quad \text{[Math. 3]}$$
$$\frac{1}{2}\frac{\partial E}{\partial a_2} = \sum_i w_i (a_1 g_i + a_2 - r_i)$$

In order to minimize the square error E, (Math. 3) needs to be 0, and thus the coefficient $a_j$ is obtained with (Math. 4). However, the notation of the suffix i is omitted on the grounds of space.

$$\begin{pmatrix} a_1 \\ a_2 \end{pmatrix} = \begin{pmatrix} -\dfrac{\sum wg \sum wr - \sum w \sum wgr}{\sum wg^2 \sum w - (\sum wg)^2} \\ \dfrac{\sum wg^2 \sum wr - \sum wg \sum wgr}{\sum wg^2 \sum w - (\sum wg)^2} \end{pmatrix} \quad \text{[Math. 4]}$$

Alternatively, when the second prediction unit performs correction in proportion, similarly as in the case of the affine prediction, the representative value $g_i$ is calculated for every small region in the block from the coded first residual signal with the proportionality coefficient $a_j$ (j=1) as the second prediction coefficient, and the residual signal $r_i$ of the relevant block is predicted with (Math. 5). In the calculation of the representative value, it is desirable to provide resistance to noise by using the Gaussian filter, or the like similar to the description made above.

$$r_i = a_1 g_i, 1 \le i \le n \quad \text{[Math. 5]}$$

Here, n is the number of pixels in the block. The prediction coefficient $a_j$ is estimated to minimize the weighted square sum of the prediction error. One example of a calculation method will be specifically described for the prediction coefficient $a_j$. The weighted square sum E of the prediction error is expressed with (Math. 6).

$$E = \sum_i w_i (a_1 g_i - r_i)^2 \quad \text{[Math. 6]}$$

In this case, the partial differentiation of the square error E by the coefficient $a_j$ is expressed with (Math. 7).

$$\frac{1}{2}\frac{\partial E}{\partial a_1} = \sum_i w_i g_i (a_1 g_i - r_i) \quad \text{[Math. 7]}$$

In order to minimize the square error E, (Math. 7) needs to be 0, and thus the multiplier $a_j$ is obtained with (Math. 8). However, the notation of the suffix i is omitted on the grounds of space.

$$a_1 = \frac{\sum wgr}{\sum wg^2} \quad \text{[Math. 8]}$$

The second prediction unit 20 may have the polynomial equation of two or more orders as a prediction expression. Alternatively, the second prediction unit 20 may have a plurality of prediction expressions, and may appropriately switch the prediction expression. When the respective prediction expression is applied, a combination that minimizes the coding cost is selected. In this case, the information representing the selected prediction expression and the prediction coefficient are sent to the coding unit 5 as the second prediction information.

In either case, the weight coefficient $w_i$ can be arbitrarily set. In the first prediction unit and the first compensation unit, it is desirable to maintain the image quality high at the lower end and the right end of the block (in the example of (b2) of FIG. 4, lower end is positions of $r_4$, $r_9$, $r_{12}$, and $r_{16}$, and right end is positions of $r_{13}$, $r_{14}$, $r_{15}$, and $r_{16}$) since these ends are used for the prediction and the compensation of the neighboring block coded at the time point later than the block to be coded. In other words, the weight coefficients of the lower end and the right end of the block are made relatively high to maintain the image quality of the relevant location high.

Only one set of prediction coefficients may be obtained for the entire unit block, or the prediction coefficient may be obtained for each small region performed with filter processing. In the example of FIG. 4, a set of prediction coefficients for predicting the entire block (b2) from the entire block (a2) may be obtained, or four sets of prediction coefficients for predicting the corresponding regions B1, B2, B3 and B4 from the small regions A1, A2, A3, and A4 may be obtained. From the standpoint of code amount, it is preferable to set to obtain only one set of prediction coefficients for the entire unit block.

The second compensation unit 21 reconstructs the second prediction signal, and obtains the second prediction signal from the second prediction information from the second prediction unit 20 and the first residual signal from the second addition unit 24. The generated second prediction signal is output to the second addition unit 24 and the second difference unit 23.

In the above-described example where the second prediction unit 20 uses the affine prediction for the prediction function and the second prediction information is configured from the prediction coefficient $a_j$, the prediction signal is generated with (Math. 9).

$$r_i = a_1 g_i + a_2 \quad \text{[Math. 9]}$$

The second prediction signal is sent to the second differential unit 23 and the second addition unit 24 in the encoder, and only to the second addition unit 64 in the decoder.

The third prediction unit 30 determines the third prediction information for reducing the redundancy that exists in the input pixel in the unit block.

The third prediction unit 30 first calculates the prediction coefficient for approximating the pixel signal with the method, to be described later, from the coded pixel signal (reconstructed pixel signal) saved in the third accumulation unit 32. The calculated prediction coefficient is sent to the third compensation unit 31 and the coding unit 5 as the third prediction information.

The calculation of the prediction coefficient by the third prediction unit 30, and the generation procedure of the third prediction signal by the third compensation unit 31 will be described below. It is to be noted that in the third prediction unit 30 as well, there is a coded block (a2) in a different channel in the block of the same position in the same time frame in advance when coding the block (b2) to be coded, as described using FIG. 3 in the second prediction unit 20.

Figure 5:
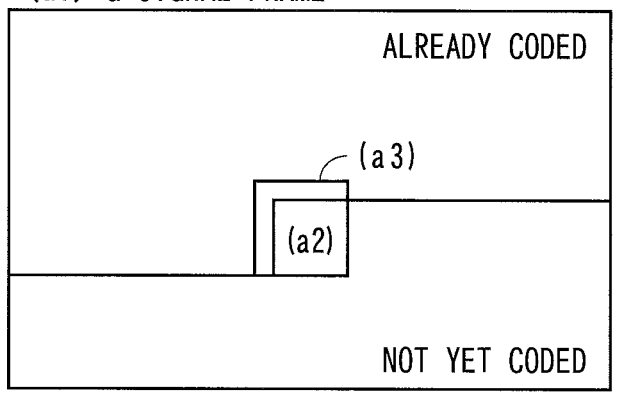
Figure 5:
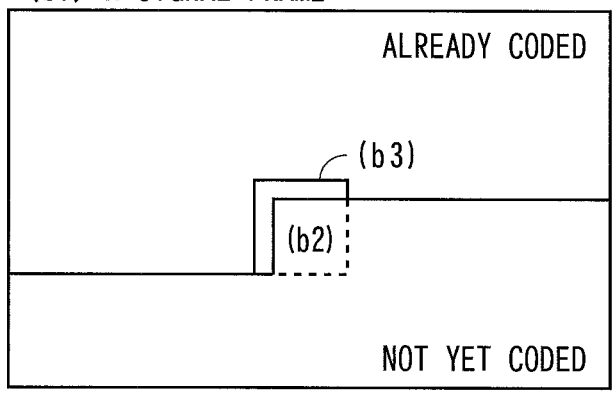
Figure 5:
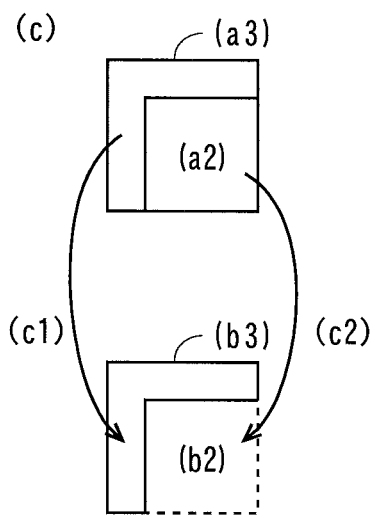

A case in which the third prediction unit 30 predicts the pixel signal from the coded neighboring pixel will be described using FIG. 5 as one example in which the third prediction unit 30 performs correction by the prediction coefficient. In FIG. 5, the G signal frame (a1) including the coded block (a2) and the R signal frame (b1) including the block (b2) to be coded in which the time and position are common with the (a2) but the signal channel is different are shown, similarly as used in the example of FIG. 3.

In the third prediction unit 30, the already coded neighboring pixel (b3) being in the vicinity adjacent to the block (b2) to be coded and being already coded, and the coded neighboring pixel (a3) of the same position as the (b3) in the frame (a1) are used. Assuming that the correspondence relationship of the coded neighboring pixels (a3) and (b3) corresponds to the correspondence relationship of the relevant blocks (a2) and (b2), the prediction coefficient similar to the second prediction unit 20 is calculated from the coded neighboring pixels (a3) and (b3), and applied to the blocks (a2) and (b2).

In other words, as shown in (c1) of FIG. 5(c), the representative value $g_i$ in (Math. 1) to (Math. 8) is calculated based on each pixel signal value of the region (a3). The signal $r_i$ of (b3) at the same position is predicted using the representative value $g_i$ calculated with respect to each pixel position of the (a3) to obtain the prediction coefficient. Then, as shown in (c2), the block (b2) to be coded is predicted from the coded block (a2) using the prediction coefficient for predicting (b3) from the coded neighboring pixel region (a3).

The difference with the second prediction unit 20 is whether the processing target region is the position of the block to be coded or the coded pixel region in the vicinity thereof, and whether the processing target is the first residual signal or the pixel signal, and whether or not to hold the prediction coefficient. In other words, the third prediction unit 30 directly predicts the pixel signal as shown in (c2), and also does not need to hold the prediction coefficient by carrying out the process similarly in the decoding process since the prediction coefficient can be calculated from (a3) and (b3) or the coded regions as shown in (c1), and hence the code amount of the prediction information can be reduced.

The third prediction unit 30 can apply different prediction coefficients for every pixel signal without increasing the code amount of the prediction coefficient as it does not hold the prediction coefficient. For instance, when calculating the prediction coefficient for each pixel signal of the processing target block, each small region in the target block or each target block, the prediction coefficient can be changed by setting the weight coefficient according to the distance from the target pixel to the neighboring pixel and/or the difference between the target pixel value and the neighboring pixel. The correspondence can be appropriately set by partitioning either one of or both of the regions of the neighboring pixel or the block to be coded into small regions, and the prediction coefficient may be set for every correspondence. The setting may be to obtain the prediction coefficient with respect to each small region of the block to be coded. But the increase in code amount does not occur even when obtaining a plurality of sets of prediction coefficients in the entire block, as opposed to the case of the second prediction unit 20.

Furthermore, the third prediction unit 30 can maintain the prediction accuracy high without causing quantization error in the prediction coefficient as it does not hold the prediction coefficient. As the third prediction unit 30 does not need to code the prediction coefficient, the accuracy can be enhanced using the fact that the code amount does not relatively increase even if a polynomial equation of higher order is used. For instance, when the third prediction unit 30 performs correction with the quadratic expression as an example of the correction by the prediction coefficient, similarly as in the case of the second prediction unit 20, the representative value $g_i$ is calculated for every small region or the entire region of the neighboring pixel from the coded pixel signal positioned in the vicinity of the block to be coded, and the coded pixel signal $r_i$ positioned in the vicinity of the target block is predicted with (Math. 10), assuming the coefficient $a_j$ ($1 \leq j \leq 3$) is the third prediction coefficient. In the calculation of the representative value, it is desirable to give resistance to noise by using the Gaussian filter and the like in the relevant region or the entire neighboring pixel region.

$$r_i = a_1 g_i^2 + a_2 g_i + a_3 \quad 1 \leq i \leq n \quad \text{[Math. 10]}$$

Here, n is the number of pixels in the block. The prediction coefficient $a_j$ is estimated to minimize the weighted square sum of the prediction error. One example of the calculation method for the prediction coefficient $a_j$ will be specifically described. The weighted square sum E of the prediction error is expressed with (Math. 11).

$$E = \sum_i w_i (a_1 g_i^2 + a_2 g_i + a_3 - r_i)^2 \quad \text{[Math. 11]}$$

In this case, the partial differentiation of the square error sum E by the coefficient $a_j$ is expressed with (Math. 12).

$$\frac{1}{2} \frac{\partial E}{\partial a_1} = \sum_i w_i g_i^2 (a_1 g_i^2 + a_2 g_i + a_3 - r_i) \quad \text{[Math. 12]}$$

$$\frac{1}{2} \frac{\partial E}{\partial a_2} = \sum_i w_i g_i (a_1 g_i^2 + a_2 g_i + a_3 - r_i)$$

$$\frac{1}{2} \frac{\partial E}{\partial a_3} = \sum_i w_i (a_1 g_i^2 + a_2 g_i + a_3 - r_i)$$

In order to minimize the squarer error E, each equation in (Math. 12) needs to become 0, and hence the multiplier $a_j$ is obtained with (Math. 13). However, the notation of the suffix i is omitted on the grounds of space.

$$\begin{pmatrix} a_1 \\ a_2 \\ a_3 \end{pmatrix} = \begin{pmatrix} \frac{(\sum wg^3 \sum wgr - \sum wg^2 \sum wg^2 r)\sum w +}{((\sum wg^2)^2 - \sum wg^3 \sum wg)\sum wr -} \\ \frac{\sum wg^2 \sum wg \sum wgr + \sum wg^2 \sum wg^2 r}{(\sum wg^4 \sum wg^2 - (\sum wg^3)^2)\sum w - \sum wg^4 \sum wg^2 +} \\ 2\sum wg^3 \sum wg^2 \sum wg - (\sum wg^2)^3 \\ \frac{(\sum wg^4 \sum wgr - \sum wg^3 \sum wg^2 r)\sum w +}{(\sum wg^3 \sum wg^2 - \sum wg^4 \sum wg)\sum wr -} \\ \frac{(\sum wg^2)^2 \sum wgr + \sum wg^2 \sum wg \sum wg^2 r}{(\sum wg^4 \sum wg^2 - (\sum wg^3)^2)\sum w - \sum wg^4 \sum wg^2 +} \\ 2\sum wg^3 \sum wg^2 \sum wg - (\sum wg^2)^3 \\ \frac{(\sum wg^4 \sum wg^2 - (\sum wg^3)^2)\sum wr +}{(\sum wg^3 \sum wg^2 - \sum wg^4 \sum wg)\sum wgr +} \\ \frac{(\sum wg^3 \sum wg - (\sum wg^2)^2)\sum wg^2 r}{(\sum wg^4 \sum wg^2 - (\sum wg^3)^2)\sum w - \sum wg^4 \sum wg^2 +} \\ 2\sum wg^3 \sum wg^2 \sum wg - (\sum wg^2)^3 \end{pmatrix}$$

[Math. 13]

Alternatively, when the third prediction unit 30 performs correction in affine prediction or in proportion, the r and g in (Math. 1) and (Math. 5) can be similarly processed by replacing with the coded pixel signal positioned in the vicinity of the target block and the representative value calculated for every small region from the coded pixel signal positioned in the vicinity of the block to be coded.

The region of the coded neighboring pixel in the third prediction unit 30 may be a predetermined region combining a predetermined number of columns on the left side of the target block, a predetermined number of rows on the upper side, and the area corresponding to the intersecting area of the relevant rows and columns and being the diagonal portion with respect to the target block as in (a3) and (b3) of FIG. 5, or may be only one portion of such region. It may be a block that contacts the target block on the left side or the upper side, or one part thereof. If there is an area that cannot be referenced at the position of the frame end, the referencing area is appropriately switched, or only the portion that can be referenced may be used. The technique disclosed in Non Patent Literature 2, may be used for the setting of the region.

Non Patent Literature 2 Y-H, Kim, B, Choi and J. Pailc "High-fidelity RGB Video Coding using Adaptive Inter-plane Weighted Prediction", IEEE Transactions on Circuits and Systems for Video Technology, 19, 7, pp. 1051-1056 (2009).

The third compensation unit 31 reconstructs the third prediction signal, and obtains the third prediction signal from the third prediction information from the third prediction unit 30 and the coded pixel signal (reconstructed pixel signal) saved in the third accumulation unit 32. The generated third prediction signal is output to the third addition unit 34 and the third differential unit 33.

In the above described example, the prediction signal is generated with (Math. 10) if the third prediction unit 30 uses the quadratic expression for the prediction function, and the third prediction information is configured from the prediction coefficient $a_j$.

The third prediction signal is sent to the third differential unit 33 and the third addition unit 34 in the encoder, and only to the third addition unit 74 in the decoder.

Each function block of the image coding device shown in FIG. 1 has been described above. The flow of processes of the prediction reference signal and the predicted signal in the present invention as described using the G signal and the R signal in the examples of FIG. 3 and FIG. 5 will be described below. The prediction reference signal of each channel configuring the signal is first coded with respect to a target unit block. When coding the prediction reference signal, the signal in a different channel is not yet coded in the unit target block, and hence the second prediction unit 20 and the third prediction unit 30 cannot be applied with respect to the input image signal. Therefore, coding is carried out only in the function block group 100, and the processes in the function block groups 200 and 300 are omitted.

In the skipping process for omission, processes similar to the processes of when the second prediction unit 20 and the second compensation unit 21 are omitted in case when the input first residual signal is flat can be applied. In other words, the first residual signal is coded in the unchanged value (as second residual signal in form), and at the same time, the first prediction information and the second prediction information serving as information notifying that the second residual signal has the value of the first residual signal are coded. Alternatively, the information notifying that it is the prediction reference signal and that the first residual signal is used may be added to the first or second prediction information. The corresponding processes thus can be carried out on the decoder side as well.

The reconstructed pixel signal of the target block is saved in the first accumulation unit 12 and the third accumulation unit 32, and the reconstructed residual signal of the target block is saved in the second accumulation unit 22 by the coding of the prediction reference signal.

The coding of the channel of the predicted signal of the target block is carried out after such state is obtained. The coding process with respect to the predicted signal is as described with regards to FIG. 1, and in particular, the reconstructed pixel signal of the predicted signal itself is saved and used in the first accumulation unit 12 (prediction reference signal can also be used). In the second and third accumulation units 22 and 32, the reconstructed residual signal and the reconstructed pixel signal in the prediction reference signal already coded in the target block are used. On each accumulation unit 12, 22, 32, the pixel blocks necessary for the prediction is to be held at each time point.

According to the image coding device having the configuration described above, when carrying out transformation on the pixels of the region to be coded of each unit block in the transformation unit 1, the spatially corresponding differential value of each pixel is transformed based on the second or third residual signal input from the second differential unit 23 or the third differential unit 33 by the quantization unit 2, and coded by the coding unit 5.

The residual signal input to the transformation unit 1 is appropriately selected from the residual signal obtained through the first prediction and compensation, the residual signal obtained through the first prediction and compensation and second prediction and compensation, or the residual signal obtained through the third prediction and compensation. Hence, high coding efficiency can be obtained by adopting signal prediction of predicting the signal of the target block from the coded pixel signal and reducing the amount of information by adaptively selecting different prediction and compensation units.

In correspondence with the description of FIG. 1 made above, each function block of the image decoding device of the present invention shown in FIG. 2 will be described. The decoding unit 6 decodes the code information coded by the coding unit 5 of the image coding device to obtain the quantization value, and the first to third prediction information. The inverse quantization unit 7 and the inverse transformation unit 8 process the quantization value to obtain the second or third residual. The inverse quantization unit 7 and the inverse transformation unit 8 have functions similar to the inverse quantization unit 3 and the inverse transformation unit 4 of the coding device.

The first compensation unit 51, the first accumulation unit 52, and the first addition unit 54 have functions same as the first compensation unit 11, the first accumulation unit 12, and the first addition unit 14 in the coding device. The second compensation unit 61, the second accumulation unit 62, and the second addition unit 64 have functions same as the second compensation unit 21, the second accumulation unit 22, and the second addition unit 24 in the coding device. The third compensation unit 71, the third accumulation unit 72, and the third addition unit 74 have functions same as the third compensation unit 31, the third accumulation unit 32, and the third addition unit 34 in the coding device. As described in the description of FIG. 1, the output of each compensation unit is sent to the addition unit and the differential unit in the coding device, but is sent to only the addition unit in the decoding device.

The first, second, and third switching units 80, 81, 82 also have functions similar to the first, second, and third switching units 40, 41, 42 in the coding device, but the first switching unit has a role of outputting the pixel signal sent from the corresponding compensation unit and the addition unit instead of carrying out the switching of the second residual signal and the third residual signal as in the coding device. As described above, only the third prediction unit 70 in which the prediction coefficient is not coded is necessary for the prediction unit in the decoding device, and the first and second prediction units are not necessary.

The invention claimed is:

1. An image coding device for coding an input image for every unit block in coding using prediction, the image coding device comprising:
   a first prediction unit for determining first prediction information for predicting a block to be coded using a reconstructed pixel signal reconstructed using a coded signal;
   a first compensation unit for obtaining a first prediction signal of said block to be coded from said first prediction information and said reconstructed pixel signal;
   a first differential unit for obtaining a difference between a signal of said block to be coded and said first prediction signal as a first residual signal;
   a second prediction unit for determining second prediction information as a prediction coefficient for predicting said first residual signal using a reconstructed residual signal reconstructed using the coded signal;
   a second compensation unit for obtaining a second prediction signal of said first residual signal from said second prediction information and said reconstructed residual signal;
   a second differential unit for obtaining a difference between said first residual signal and said second prediction signal as a second residual signal;
   a third prediction unit for determining third prediction information as a prediction coefficient for predicting said block to be coded using said reconstructed pixel signal;
   a third compensation unit for obtaining a third prediction signal of said block to be coded from said third prediction information and said reconstructed pixel signal;
   a third differential unit for obtaining a difference between a signal of said block to be coded and said third prediction signal as a third residual signal; and
   a switching unit for switching and selecting one of either said second residual signal or said third residual signal for every unit block, wherein
   orthogonal transformation, quantization, and coding are performed on the selected residual, and said reconstructed residual signal and said reconstructed pixel signal are obtained using prediction information corresponding to the selected residual to code the prediction information.

2. The image coding device according to claim 1, wherein said switching unit compares a coding cost of said first prediction information, said second prediction information, and said second residual, and a coding cost of said third prediction information and said third residual to select lower coding cost when selecting one of either said second residual signal or said third residual signal.

3. The image coding device according to claim 2, wherein said switching unit carries out the comparison including the cases when the value of either said second residual or said third residual is set to zero when comparing the coding costs, and carries out coding with the value of the corresponding residual signal as zero if the coding cost of when the value is set to zero is the lowest.

4. The image coding device according to claim 1, wherein the reconstructed residual signal used in said second prediction unit and said second compensation unit, and the reconstructed pixel signal used in said third prediction unit and said third compensation unit are signals reconstructed based on a second channel signal already coded in the block to be coded, separately from a first channel signal to be coded in said block to be coded.

5. The image coding device according to claim 1, wherein said first prediction unit determines said first prediction information as information of an intra prediction mode using an intra prediction.

6. The image coding device according to claim 1, wherein said second prediction unit and said third prediction unit determine said second prediction information and said third prediction information of the block to be coded after obtaining a representative value for every small region in the unit block to be coded with respect to said reconstructed residual signal and said reconstructed pixel signal.

7. The image coding device according to claim 6, wherein said representative value is a representative value based on filter processing with respect to said reconstructed residual signal and said reconstructed pixel signal for every said small region.

8. The image coding device according to claim 1, wherein said second prediction unit and said third prediction unit determine said second prediction information and said third prediction information to minimize a weighted square sum at each pixel position of said second residual signal and said third residual signal, and set a weighting coefficient of the square sum relatively high for a pixel position referenced in the prediction of the unit block to be subsequently coded.

9. The image coding device according to claim 1, wherein said second prediction unit and said second compensation unit are omitted when said first residual signal is flat, so that a signal having the same value as said first residual signal is adopted for said second residual signal, and information notifying the application of the omission is adopted as said second prediction information.

10. The image coding device according to claim 1, wherein said second prediction unit and said third prediction unit obtain said second prediction information and said third prediction information as coefficients in a polynomial prediction.

11. The image coding device according to claim 1, wherein said third prediction unit obtains said third prediction coefficient using a coded neighboring region being in the vicinity of said block to be coded and being already coded, only information notifying that said third prediction unit is applied being coded and said third prediction coefficient not being coded when coding said third prediction information.

12. An image decoding device for decoding code information coded by the image coding device according to claim 1, the image decoding device comprising:
   a decoding unit for decoding said code information to said first to said third prediction information, and said second or third residual;
   a first decoding side compensation unit for reconstructing said first prediction signal using a decoded pixel signal and said first prediction information;
   a second decoding side compensation unit for reconstructing said second prediction signal using a decoded residual signal and said second prediction information;
   a third decoding side prediction unit for reconstructing said third prediction coefficient using said decoded pixel signal and said third prediction information; and
   a third decoding side compensation unit for reconstructing said third prediction signal using said third prediction coefficient and said decoded pixel, wherein
   when said first and second prediction information and said second residual are decoded in said decoding unit, said second prediction signal and said second residual are added to reconstruct said first residual, and the first residual and said first prediction signal are added to decode the pixel signal, and
   when said third prediction information and said residual are decoded in said decoding unit, said third residual and said third prediction signal are added to decode the pixel signal.

* * * * *